(12) United States Patent
Grotjohn et al.

(10) Patent No.: US 7,895,567 B2
(45) Date of Patent: Feb. 22, 2011

(54) PRE-ASSEMBLING DRAG-AND-DROP OBJECTS BEFORE COMMITTING A DROP OBJECT

(75) Inventors: David K. Grotjohn, Cary, NC (US); Masato Noguchi, Sagamihara (JP); Li Xu, Cary, NC (US); Jianjun Zhang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1286 days.

(21) Appl. No.: 11/405,998

(22) Filed: Apr. 18, 2006

(65) Prior Publication Data

US 2007/0245302 A1 Oct. 18, 2007

(51) Int. Cl.
*G06F 9/44* (2006.01)

(52) U.S. Cl. .................. 717/107; 717/108; 717/109; 717/110; 717/113; 715/763; 715/765

(58) Field of Classification Search ......... 717/104–109, 717/113, 117; 715/763, 765; 709/203
See application file for complete search history.

(56) References Cited

U.S. PATENT DOCUMENTS

| | | | | |
|---|---|---|---|---|
| 6,002,867 A * | 12/1999 | Jazdzewski | ............... | 717/105 |
| 6,185,728 B1 * | 2/2001 | Hejlsberg | ............... | 717/109 |
| 6,226,692 B1 * | 5/2001 | Miloushev et al. | ........... | 719/316 |
| 6,601,234 B1 * | 7/2003 | Bowman-Amuah | ......... | 717/108 |
| 6,636,242 B2 * | 10/2003 | Bowman-Amuah | ......... | 715/764 |
| 7,287,018 B2 * | 10/2007 | Lennon | ............... | 707/2 |
| 7,315,826 B1 * | 1/2008 | Guheen et al. | ............... | 705/7 |
| 7,343,585 B1 * | 3/2008 | Lau et al. | ............... | 717/108 |
| 7,406,436 B1 * | 7/2008 | Reisman | ............... | 705/10 |
| 7,634,756 B2 * | 12/2009 | Bjornson et al. | ............ | 717/107 |
| 2001/0037412 A1 * | 11/2001 | Miloushev et al. | .......... | 709/315 |

(Continued)

FOREIGN PATENT DOCUMENTS

EP 1546849 A0 6/2005

(Continued)

OTHER PUBLICATIONS

Title:Composing Integrated Systems Using GUI-Based Applications and Web Services, author: Grechanik et al, source: IEEE, dated: Jul. 9, 2007.*

*Primary Examiner*—Chameli C Das
(74) *Attorney, Agent, or Firm*—Law Office of Jim Boice

(57) ABSTRACT

A method, apparatus and computer-readable medium for assembling objects in an IDE is presented. The method includes the steps of creating a pre-drop assembly area in an Integrated Development Environment (IDE); combining multiple component descriptors in the pre-drop assembly area, wherein the multiple component descriptors are interpreted through an extensible language mechanism that contains a plurality of extensible solutions; and upon a determination that combined multiple component descriptors have met a pre-defined condition, committing the combined multiple component descriptors to execution. In one embodiment, only one solution from the plurality of extensible solutions is used to interpret the multiple component descriptors, wherein the one solution is selected according to a user role of a user who is utilizing the IDE. The multiple component descriptors may be combined in the pre-drop assembly area by dragging the multiple component descriptors individually and sequentially to the pre-drop assembly area.

14 Claims, 15 Drawing Sheets

U.S. PATENT DOCUMENTS

| | | |
|---|---|---|
| 2002/0054155 A1 | 5/2002 | Churchill et al. |
| 2002/0184610 A1* | 12/2002 | Chong et al. ................ 717/109 |
| 2003/0160825 A1 | 8/2003 | Weber |
| 2004/0216044 A1* | 10/2004 | Martin et al. ............... 715/526 |
| 2005/0065970 A1 | 3/2005 | King et al. |
| 2005/0066287 A1 | 3/2005 | Tattrie et al. |
| 2005/0160370 A1 | 7/2005 | Talley et al. |
| 2005/0166159 A1 | 7/2005 | Mondry et al. |
| 2005/0235274 A1* | 10/2005 | Mamou et al. ............... 717/136 |
| 2005/0262188 A1* | 11/2005 | Mamou et al. ............... 709/203 |
| 2005/0262190 A1* | 11/2005 | Mamou et al. ............... 709/203 |
| 2005/0262194 A1* | 11/2005 | Mamou et al. ............... 709/203 |
| 2006/0224618 A1* | 10/2006 | Garden et al. ................ 707/102 |
| 2006/0230314 A1* | 10/2006 | Sanjar et al. ................... 714/26 |
| 2007/0168931 A1* | 7/2007 | Martin et al. ............... 717/104 |
| 2007/0260612 A1* | 11/2007 | Papakonstantinou et al. .. 707/10 |
| 2008/0104571 A1* | 5/2008 | Jaeger ....................... 717/113 |

FOREIGN PATENT DOCUMENTS

JP      2001273073 A     10/2001

* cited by examiner

PRE-ASSEMBLING DRAG-AND-DROP OBJECTS BEFORE COMMITTING A DROP OBJECT

BACKGROUND OF THE INVENTION

The present invention relates in general to the field of computers and similar technologies, and in particular to software utilized in this field.

In an IDE type of environment, assembling an end product such as a HyperText Markup Language (HTML) page or a JAVA® Server Page (JSP) object often requires input from multiple components. The components may be, for example, data, controls/widgets, style/look-and-feel, etc. For example, in order to build a data table in a page in an Integrated Development Environment (IDE) using an application technology such as JavaServer Faces (JSF), a user needs to first drop the data table control to the page, which causes an empty table to be created and visualized in the editor page (pane; window) of the IDE. Then a data definition is dropped into the editor page, which will cause the data table to be "bound" to a data definition object. Essentially this particular operation involves two components that are interwoven together to form a concrete configuration (i.e., a "data-bound" JSF table).

The same result in the example above can be achieved by reversing the order of the components: the data will be dropped to the page first, then the user determines what controls to create (bind) for the data object, by way of a prompt dialog or drag and dropping the desired control onto the visualized data object. Components can be put together in different combinations in order to form more sets of concrete configurations. For instance, the control component, in addition to being applied with the data component, can be applied with a style/look-and-feel component to form concrete control(s) with the desired style/look-and-feel.

Consider then the just described prior art process for constructing a data table illustrated in FIG. 1. As shown in IDE 100, a data table 102 in the editor 104 is created by first pulling the template "Data Table" from the menu in the palette view 106, then binding the template "Data Table" to a data definition ("getEmpListParams(REQUEST_BAPI_ABSENCE)") visualized in "Page Data" view 108, and then applying the ".form" style class from the "Styles" view 110. As depicted, this requires three separate drag and drop operations to create the table 102. This is problematic to the process of creating the table 102 since, once the table 102 is dropped and visualized in the editor 104, the table 102 will contain multiple child elements that can also be the target of subsequent data binding and style binding operations. Therefore, during any subsequent drop operation it is very important that the cursor be at the right location to indicate that the target of the drop is the entire table as opposed to any child element. This can be tricky from the user's point of view and requires careful implementation from the tooling developer's point of view. Thus, a serious limitation to the drag and drop operation described above is that it supports only one component at a time. Furthermore, a drawback of the described prior art is that the order of the drag and drop operations matters, since performing these operations in a particular order may cause unintended results. For example, if a table is dropped first, and then data is dropped on top of the table, this may unintentionally cause a table column to become the target of the data drop (or a style rule drop), rather than the entire table.

SUMMARY OF THE INVENTION

As described above, there is a need for a method and system that permits contemporaneous drag-and-drop operations of individual components (e.g., data, palette control or style) in order to achieve the end result. To address this need, an improved method, apparatus and computer-readable medium is presented. In one embodiment, the method includes the steps of creating a pre-drop assembly area in an Integrated Development Environment (IDE); combining multiple component descriptors in the pre-drop assembly area, wherein the multiple component descriptors are interpreted through an extensible language mechanism that contains a plurality of extensible solutions; and upon a determination that combined multiple component descriptors have met a pre-defined condition, committing the combined multiple component descriptors to execution. The committing step may be automatic, or it may be in response to an explicit action by a user, such as pressing a "Commit" button in the IDE. The multiple component descriptors may be combined in the pre-drop assembly area by dragging the multiple component descriptors individually and sequentially to the pre-drop assembly area. In one embodiment, only one solution from the plurality of extensible solutions is used to interpret the multiple component descriptors, wherein the one solution is selected according to a user role of a user who is utilizing the IDE. Exemplary user roles are that of a database manager, User Interface developer, etc.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

The present invention presents a method, system, and computer-readable medium for performing a "pre-drop assembly" by collecting all components involved in forming a final configuration in a temporary "staging area" of an IDE editor. After inspecting the various objects contributed by all dragged/dropped components, a final configuration based on these components is determined. The drop (all dragged/dropped components) is then committed from an "in-memory configuration," which drives final drop operations to produce a final concrete result.

Figure 1:
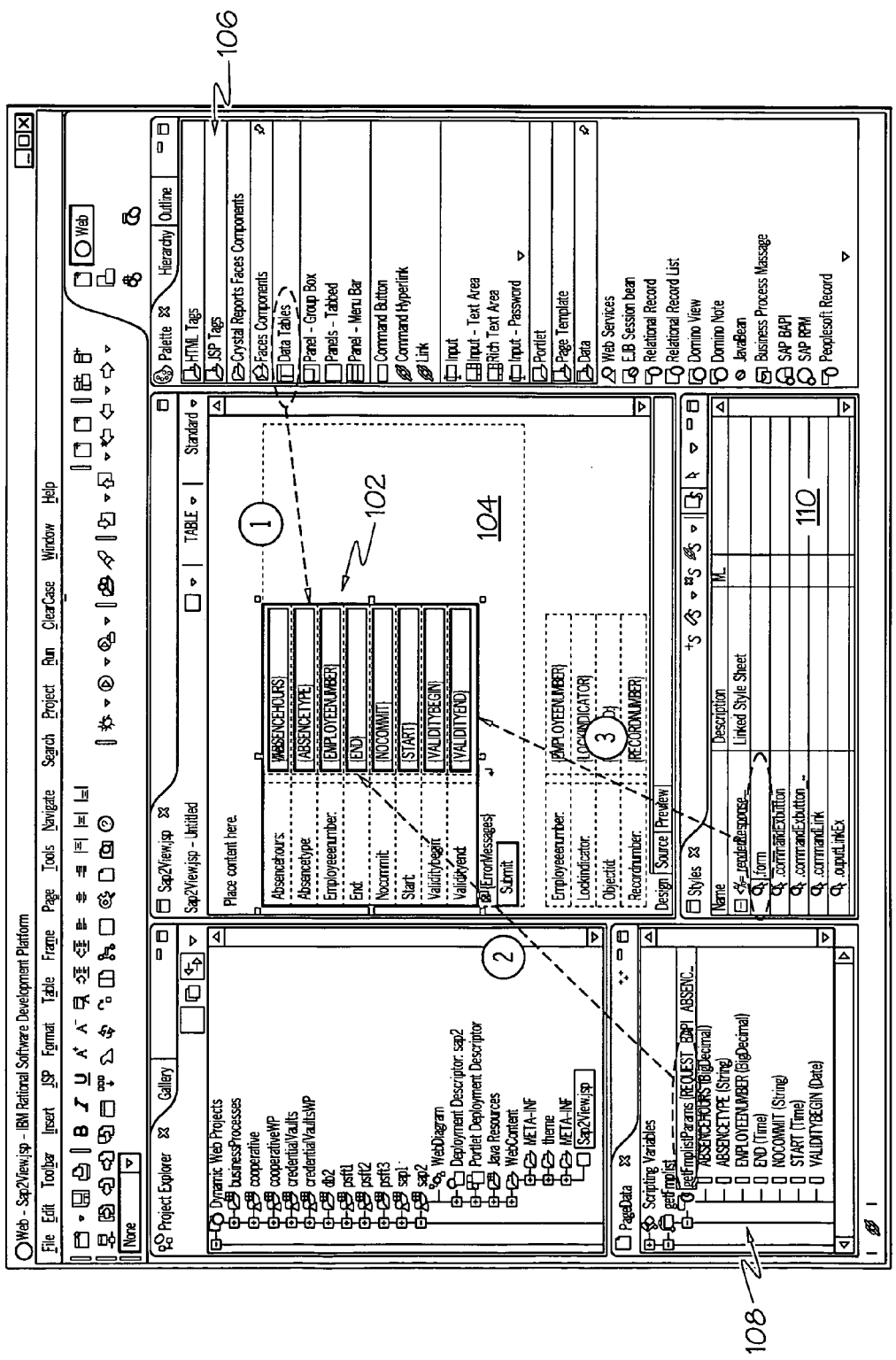
FIG. 1 illustrates a prior art method of constructing a table in an IDE editor using multiple drag-and-drop operations.
Figure 2A:
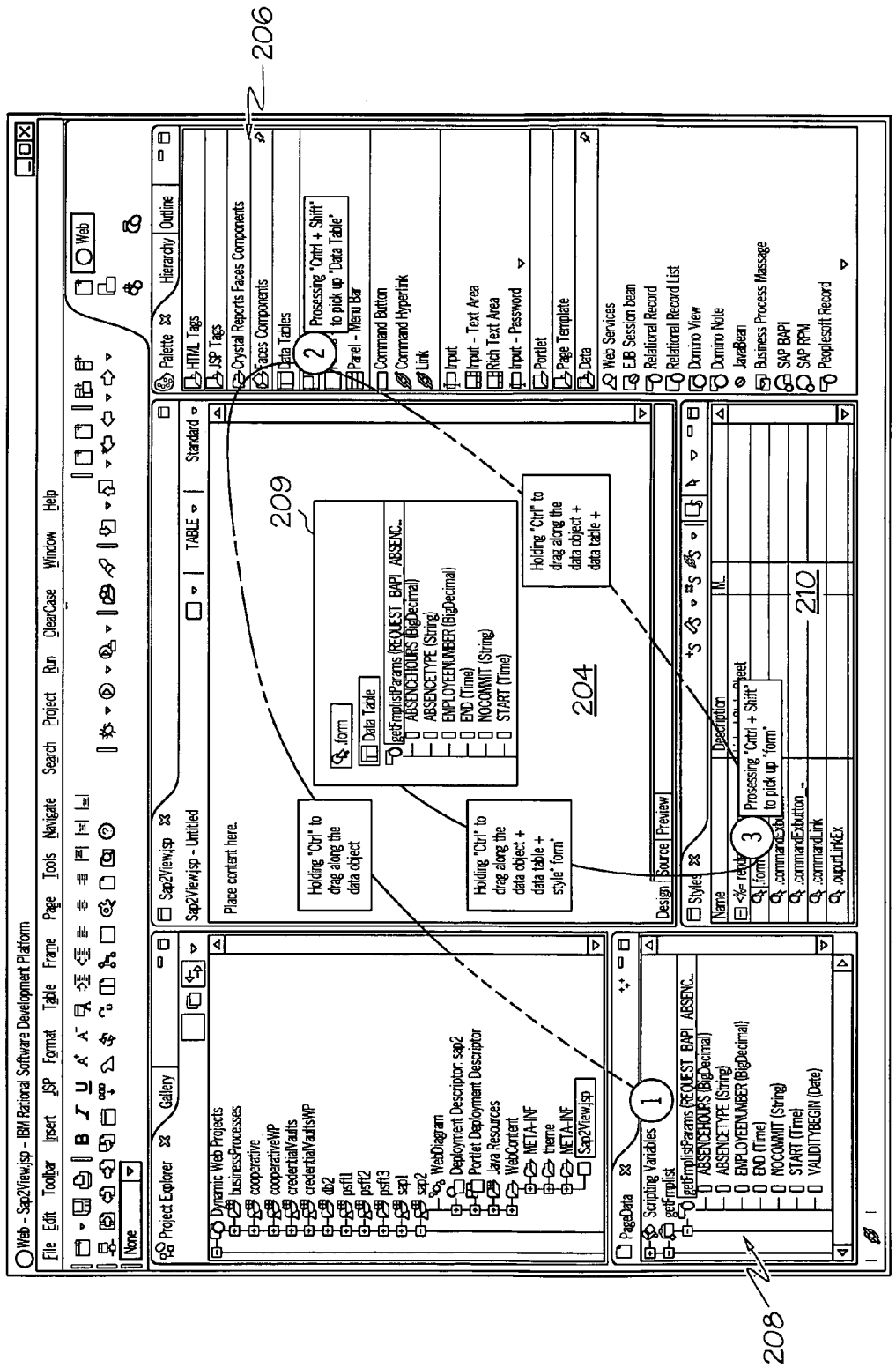
FIGS. 2A-2B depict a novel method of constructing an object in an IDE editor through the use of an intermediate pre-drop assembly area pane.

With reference now to FIG. 2a, a first method for implementing the present invention is illustrated in a specially enabled Integrated Development Environment (IDE) 200. Using a special function key (e.g., the "Ctrl" key), components from a specially enabled "Page Data" view 208, palette view 206 and "Styles" view 210 are gathered together in an assembly area 209. For example, by using the "Ctrl" key and a cursor (not shown), data ("getEmpListParams(REQUEST_ BAPI_ABSENCE)") is dragged to (hovered over) "Data Table" in palette view 106, where pressing the "Ctrl+Shift" keys causes "Data Table" to be picked up and associated with (for population by) the data "getEmpListParams(REQUEST_ BAPI_ABSENCE)." While still holding the "Ctrl" key, the combined components of "Data Table" and "getEmpListParams(REQUEST_BAPI_ABSENCE)" are dragged to (hovered over) the ".form" object found in "Styles" view 210. The object ".form" is picked up (associated with) the combination of "Data Table" and "getEmpListParams(REQUEST_ BAPI_ABSENCE)" by pressing the "Ctrl+Shift" keys, and the three combined objects are then dragged into pre-drop assembly area 212 in editor 204. Once the user verifies that that appropriate components have been dragged/dropped together, then the combined components are executed to produce a final table (such as shown in FIG. 1 as table 102). Note also that, in one embodiment, assembly area 209 is a semi-transparent window that follows mouse movement as a user goes to different parts of the IDE to pick up components sequentially. The assembly area 209 is automatically disposed of on commitment or cancellation.

Figure 2B:
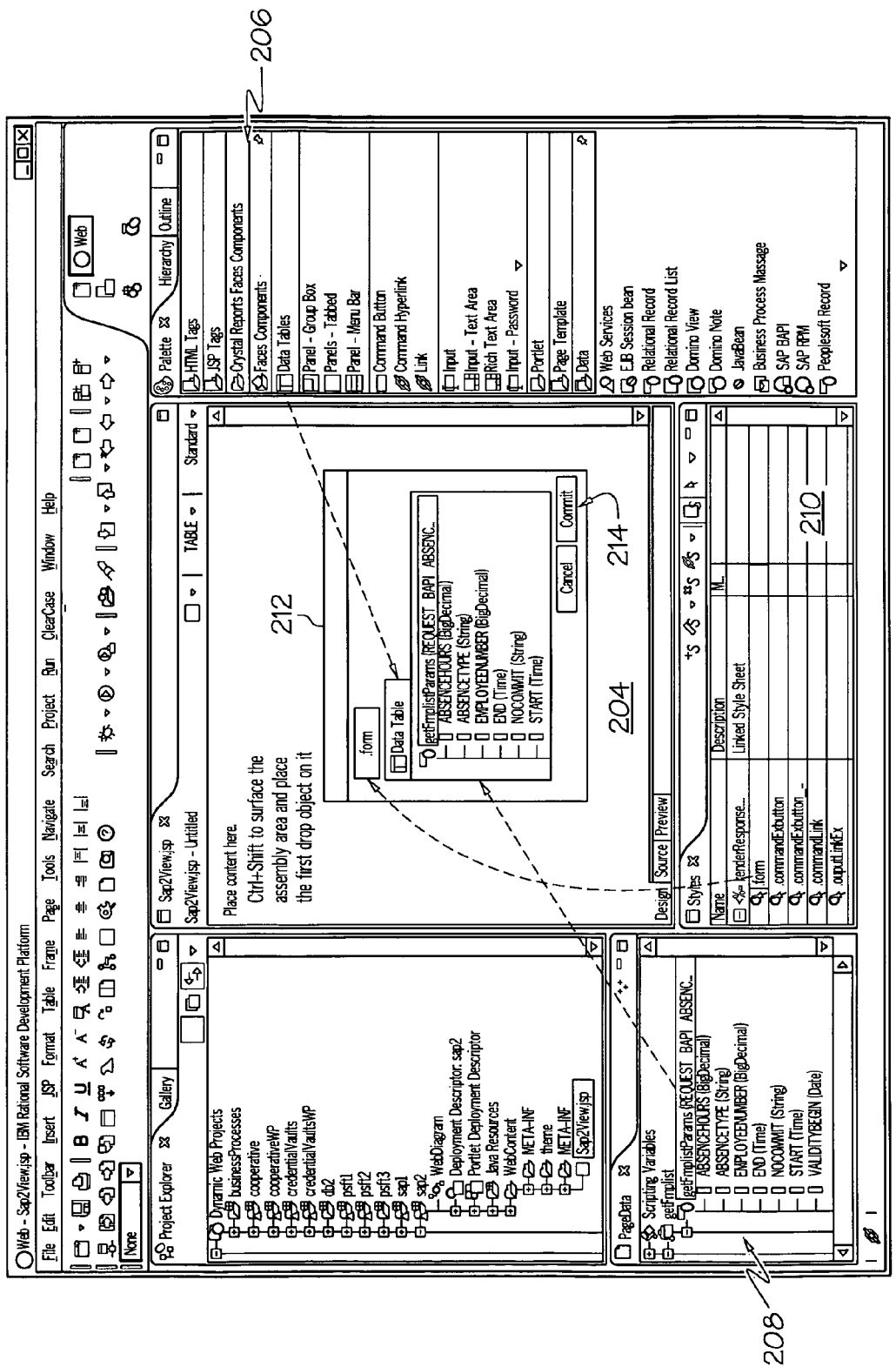

Alternatively, the special "assembly area" of pre-drop assembly area 212 may first be initialized, and then the different components are dragged into that pre-initialized pre-drop assembly area 212, as illustrated in FIG. 2b. Thus, after pre-drop assembly area 212 is surfaced in editor 204, the different components from palette view 206, "Page Data" view 208, and "Styles" view 210 are dragged sequentially into pre-drop assembly area 212. If any of the components were incorrectly dragged-and-dropped into the pre-drop assembly area 212, they can be dragged out (or simply cleared) and a correct component is dragged in to replace the cleared component. After a user or software logic determines that the appropriate components have been combined, the combined components are executed to create to table. Note that the order in which components are dragged and dropped into the pre-drop assembly area 212 does not matter, thus avoiding unintended hierarchical descriptors. That is, the order in which different components are dragged/dropped does not matter due to the lack of initial hierarchical definitions in the pre-drop assembly area 212. Rather, pre-drop assembly area 212 applies each component to all of the other components that are dragged/dropped into the pre-drop assembly area 212. Note also that, in one embodiment, pre-drop assembly area 212 is a modal-less window, not a modal window, so that while pre-drop assembly area 212 is popped up, additional mouse interactions can be made with other parts of the IDE in order to pick up more components.

As shown and described, FIG. 2a shows exemplary steps taken to drop components that are sequentially collected and dropped automatically as a user releases a mouse button to commit the drop. As described in FIG. 2a, an assembly area 209 rather than a pre-drop assembly area 212 is used. However, FIG. 2b shows exemplary steps taken to drop components by individually collecting the components and placing them in the pre-drop assembly area 212. In one embodiment, pre-drop assembly area 212 is surfaced (displayed) by pressing some key combo, such as Ctrl+shift buttons, while dropping the first component. After dropping the components into the pre-drop assembly area 212, a user can then click a button near the pre-drop assembly area 212 (such as a "Commit" button 214), thus committing the drop.

Note that, as described above, in the method described in FIG. 2a, final drop position of the combined components is determined by the mouse position at the time of commitment. In the method described in FIG. 2b, final drop position of the combined components is determined by mouse position for the very first component selected.

A logic mechanism, preferably located within Pre-drop Assembly Logic (PAL) 448, shown below in FIG. 4, allows extensible interpretations of the assembly to come up with the correct concrete configuration. In one embodiment, this assembly is implemented within an open-platform IDE environment such as Eclipse.

As thus described, through the use of one or more special keys to indicate the "multi-component pre-assemble" intention (e.g., the "Ctrl" key), drop objects follow along with the cursor arrow as it moves to other locations to pick up more objects. An additional key combination, such as "Ctrl+Shift," may be used to indicate additional object pick up.

Figure 3:
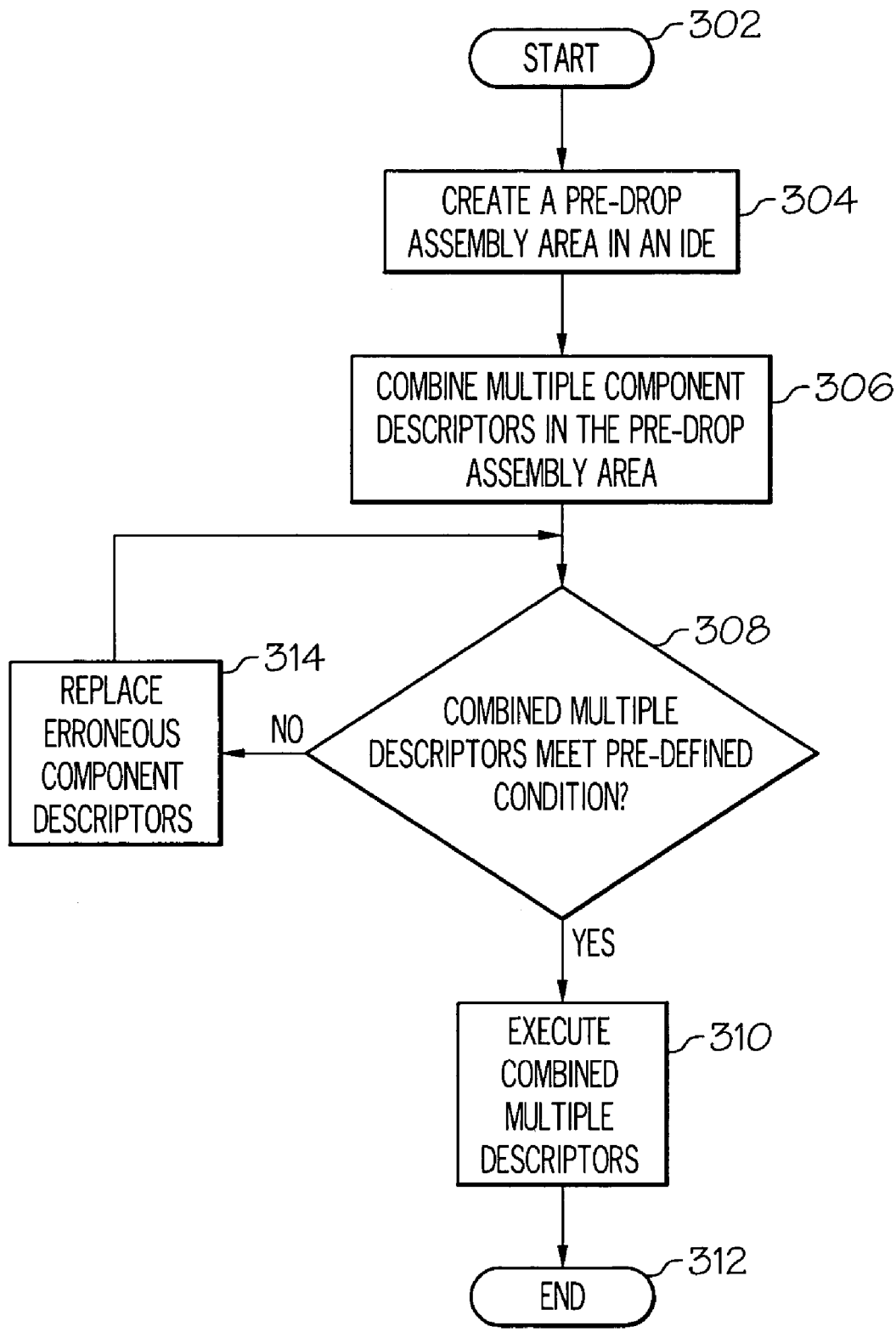
FIG. 3 is a flow-chart showing exemplary steps taken to construct an object in an IDE editor through the use of an intermediate pre-drop assembly area pane.

Referring now to FIG. 3, a flow-chart of exemplary steps taken by the present invention is presented. After initiator block 302, a pre-drop assembly area is created in an editor area of an IDE (block 304). Multiple component descriptors are then combined in the pre-drop assembly area (block 306). These component descriptors may be dragged/dropped into the pre-drop assembly area contemporaneously or sequentially, as described above. These component descriptors are preferably interpreted through an extensible language mechanism, such as JSF (JAVA® Server Faces) or JSP (JAVA® Server Page), wherein the extensible language mechanism contains a plurality of extensible solutions. In one embodiment, only one solution (interpretation) from the plurality of extensible solutions is selected according to a user role of a user who is utilizing the IDE to create an application, a software administrator, etc. A query is then made (query block 308) as to whether the combined multiple descriptors in the pre-drop assembly area meet a pre-defined condition, such as the appearance and format of the final software object being produced, if the software object is authorized to be created by a particular software or user (including the user's role), etc. If the pre-assembled object is not in the proper format, then the erroneous component descriptors are replaced (block 314) until the pre-assembled object containing the combined multiple descriptors is ready for execution (block 310), thus ending the process (terminator block 312).

Figure 4:
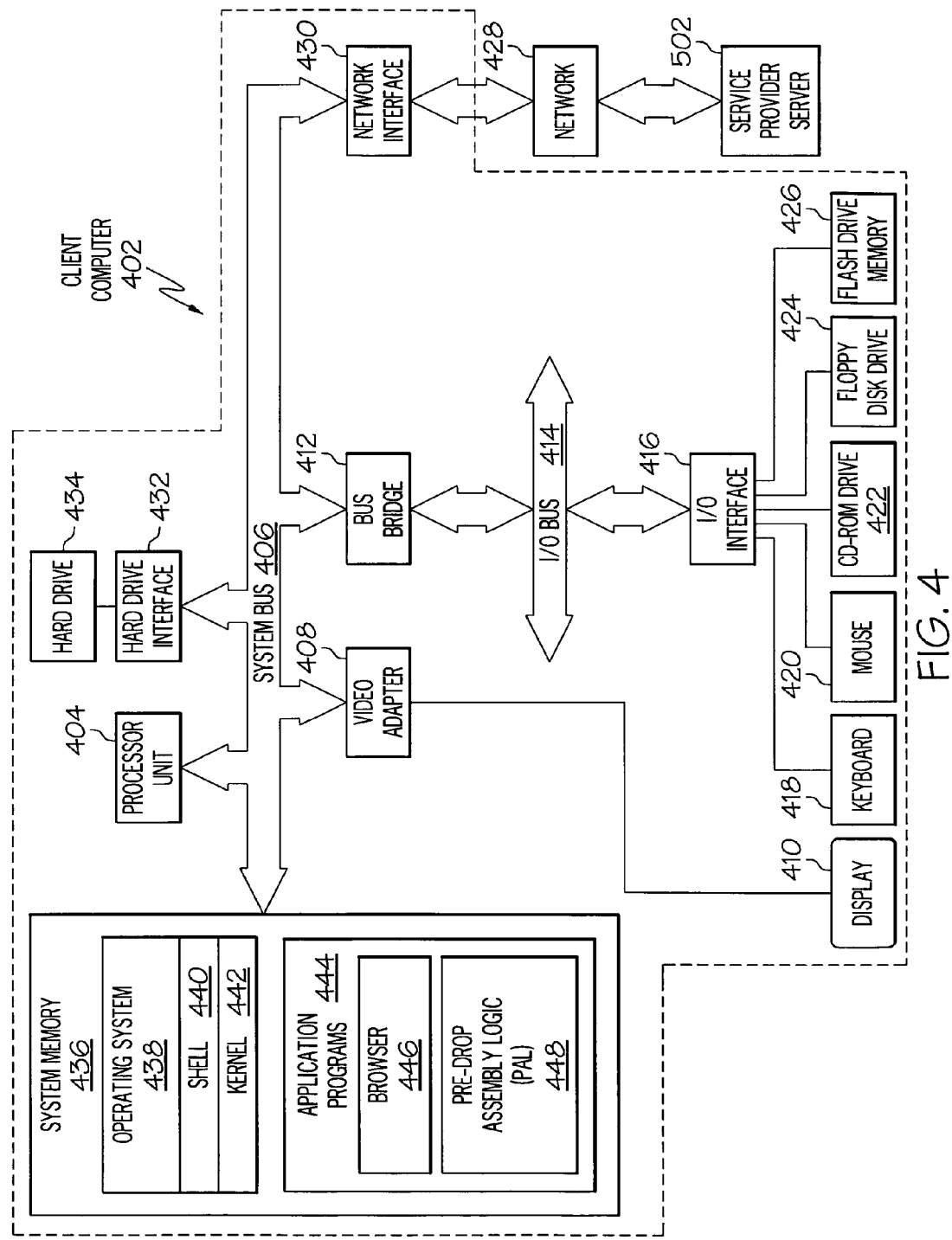
FIG. 4 depicts an exemplary client computer in which the present invention may implemented.

With reference now to FIG. 4, there is depicted a block diagram of an exemplary client computer 402, in which the present invention may be utilized. Client computer 402 includes a processor unit 404 that is coupled to a system bus 406. A video adapter 408, which drives/supports a display 410, is also coupled to system bus 406. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk-Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Client computer 402 is able to communicate with a service provider server 502 via a network 428 using a network interface 430, which is coupled to system bus 406. Network 428 may be an external network such as the Internet, or an internal network such as an Ethernet or a Virtual Private Network (VPN). Using network 428, client computer 402 is able to use the present invention to access service provider server 502.

A hard drive interface 432 is also coupled to system bus 406. Hard drive interface 432 interfaces with a hard drive 434. In a preferred embodiment, hard drive 434 populates a system memory 436, which is also coupled to system bus 406. Data that populates system memory 436 includes client computer 402's operating system (OS) 438 and application programs 444.

OS 438 includes a shell 440, for providing transparent user access to resources such as application programs 444. Generally, shell 440 is a program that provides an interpreter and an interface between the user and the operating system. More specifically, shell 440 executes commands that are entered into a command line user interface or from a file. Thus, shell 440 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 442) for processing. Note that while shell 440 is a text-based, line-oriented user interface, the present invention will equally well support other user interface modes, such as graphical, voice, gestural, etc.

As depicted, OS 438 also includes kernel 442, which includes lower levels of functionality for OS 438, including providing essential services required by other parts of OS 438 and application programs 444, including memory management, process and task management, disk management, and mouse and keyboard management.

Application programs 444 include a browser 446. Browser 446 includes program modules and instructions enabling a World Wide Web (WWW) client (i.e., client computer 402) to send and receive network messages to the Internet using HyperText Transfer Protocol (HTTP) messaging, thus enabling communication with service provider server 502.

Application programs 444 in client computer 402's system memory also include a Pre-drop Assembly Logic (PAL) 448, which includes logic for storing pre-dropped components in memory before, during, and after final execution of the objects through the IDE. PAL 448 includes code for implementing the processes described in FIGS. 2a-3. In one embodiment, client computer 402 is able to download PAL 448 from service provider server 502.

The hardware elements depicted in client computer 402 are not intended to be exhaustive, but rather are representative to highlight essential components required by the present invention. For instance, client computer 402 may include alternate memory storage devices such as magnetic cassettes, Digital Versatile Disks (DVDs), Bernoulli cartridges, and the like. These and other variations are intended to be within the spirit and scope of the present invention.

Figure 5:
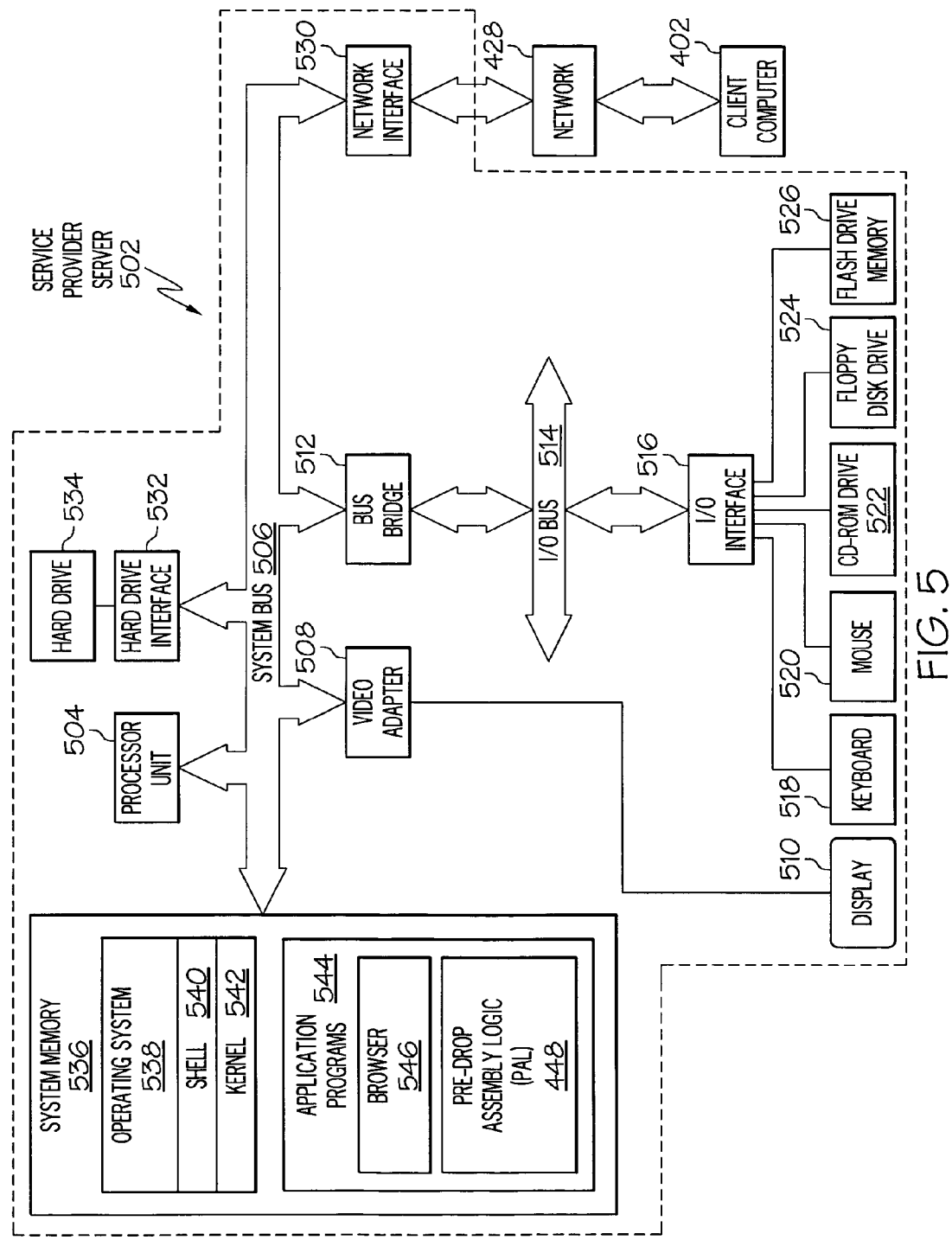
FIG. 5 illustrates an exemplary server from which software for executing the present invention may be deployed and/or implemented for the benefit of a user of the client computer shown in FIG. 4.

As noted above, PAL 448 can be downloaded to client computer 402 from service provider server 502, shown in exemplary form in FIG. 5. Service provider server 502 includes a processor unit 504 that is coupled to a system bus 506. A video adapter 508 is also coupled to system bus 506. Video adapter 508 drives/supports a display 510. System bus 506 is coupled via a bus bridge 512 to an Input/Output (I/O) bus 514. An I/O interface 516 is coupled to I/O bus 514. I/O interface 516 affords communication with various I/O devices, including a keyboard 518, a mouse 520, a Compact Disk-Read Only Memory (CD-ROM) drive 522, a floppy disk drive 524, and a flash drive memory 526. The format of the ports connected to I/O interface 516 may be any known to those skilled in the art of computer architecture, including but not limited to Universal Serial Bus (USB) ports.

Service provider server 502 is able to communicate with client computer 402 via network 428 using a network interface 530, which is coupled to system bus 506. Access to network 428 allows service provider server 502 to execute and/or download PAL 448 to client computer 402.

System bus 506 is also coupled to a hard drive interface 532, which interfaces with a hard drive 534. In a preferred embodiment, hard drive 534 populates a system memory 536, which is also coupled to system bus 506. Data that populates system memory 536 includes service provider server 502's operating system 538, which includes a shell 540 and a kernel 542. Shell 540 is incorporated in a higher level operating system layer and utilized for providing transparent user access to resources such as application programs 544, which include a browser 546, and a copy of PAL 448 described above, which can be deployed to client computer 402.

The hardware elements depicted in service provider server 502 are not intended to be exhaustive, but rather are representative to highlight essential components required by the present invention. For instance, service provider server 502 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 502 performs all of the functions associated with the present invention (including execution of PAL 448), thus freeing client computer 402 from using its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of PAL 448, are performed by service provider server 502. Alternatively, PAL 448 and the method described herein, and in particular as shown and described in FIGS. 2a-3, can be deployed as a process software from service provider server 502 to client computer 402. Still more particularly, process software for the method so described may be deployed to service provider server 502 by another service provider server (not shown).

Figure 6A:
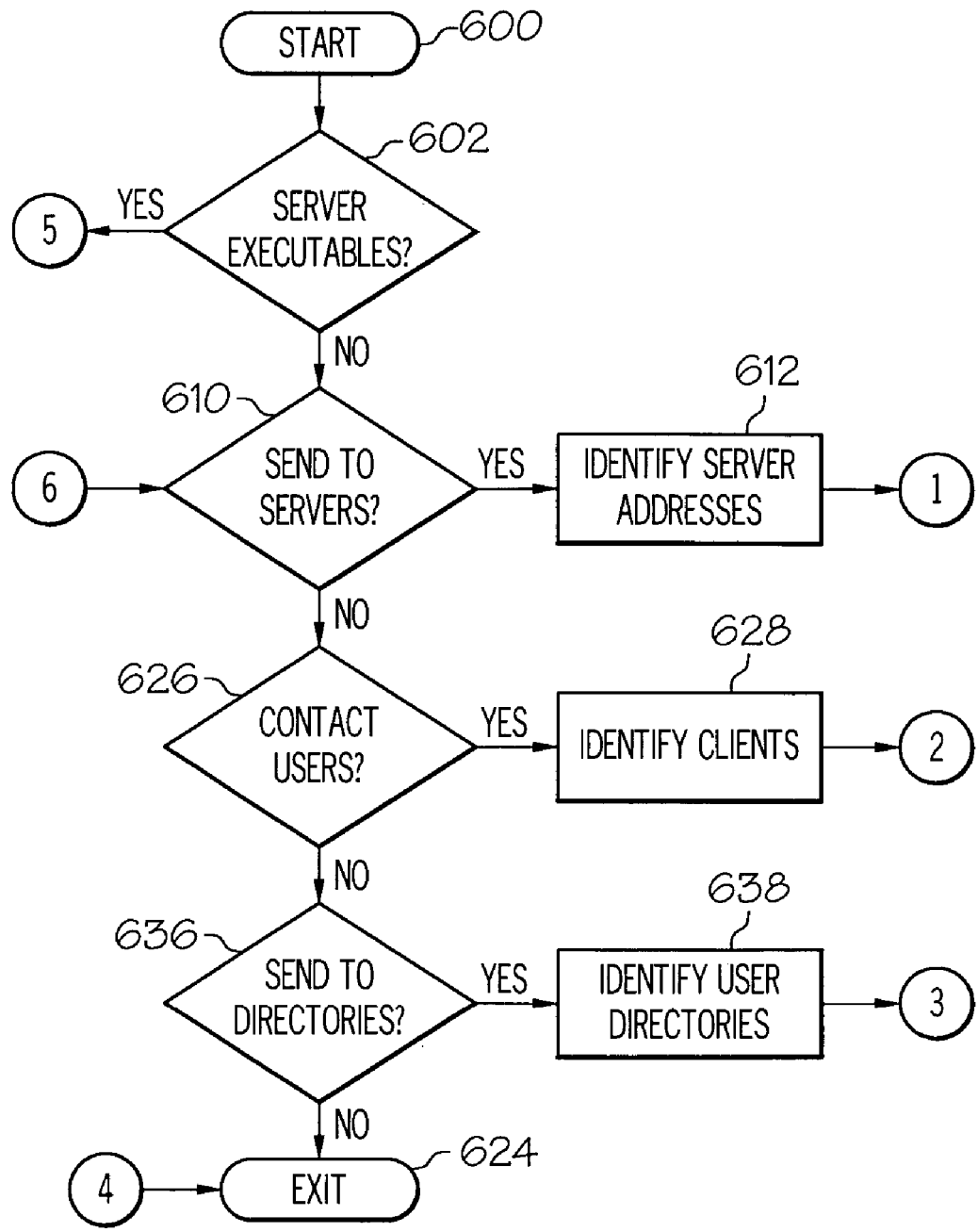
FIGS. 6A-6B show a flow-chart of steps taken to deploy software capable of executing the steps shown and described in FIGS. 2A-3.
Figure 6B:
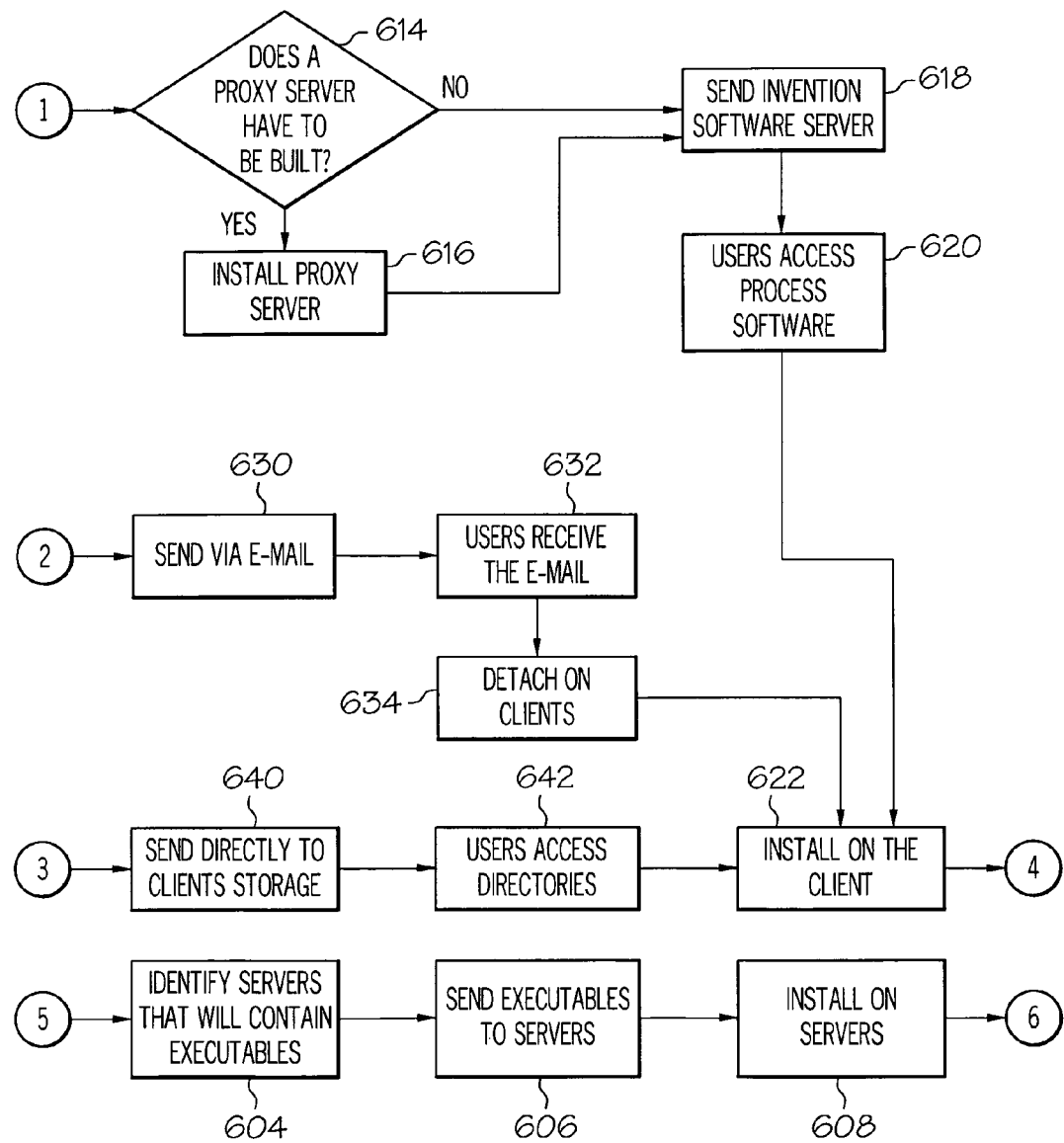

Referring then to FIGS. 6a-b, step 600 begins the deployment of the process software. The first thing is to determine if there are any programs that will reside on a server or servers when the process software is executed (query block 602). If this is the case, then the servers that will contain the executables are identified (block 604). The process software for the server or servers is transferred directly to the servers' storage via File Transfer Protocol (FTP) or some other protocol or by copying though the use of a shared file system (block 606). The process software is then installed on the servers (block 608).

Next, a determination is made on whether the process software is to be deployed by having users access the process software on a server or servers (query block 610). If the users are to access the process software on servers, then the server addresses that will store the process software are identified (block 612).

A determination is made if a proxy server is to be built (query block 614) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 618). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 620). Another embodiment is to have the servers automatically copy the process software to each client and then run the installation program for the process software at each client computer. The user executes the program that installs the process software on his client computer (block 622) then exits the process (terminator block 624).

In query step 626, a determination is made whether the process software is to be deployed by sending the process software to users via e-mail. The set of users where the process software will be deployed are identified together with the addresses of the user client computers (block 628). The process software is sent via e-mail to each of the users' client computers (block 630). The users then receive the e-mail (block 632) and then detach the process software from the e-mail to a directory on their client computers (block 634). The user executes the program that installs the process software on his client computer (block 622) then exits the process (terminator block 624).

Lastly a determination is made as to whether the process software will be sent directly to user directories on their client computers (query block 636). If so, the user directories are identified (block 638). The process software is transferred directly to the user's client computer directory (block 640). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 642). The user executes the program that installs the process software on his client computer (block 622) and then exits the process (terminator block 624).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 7A:
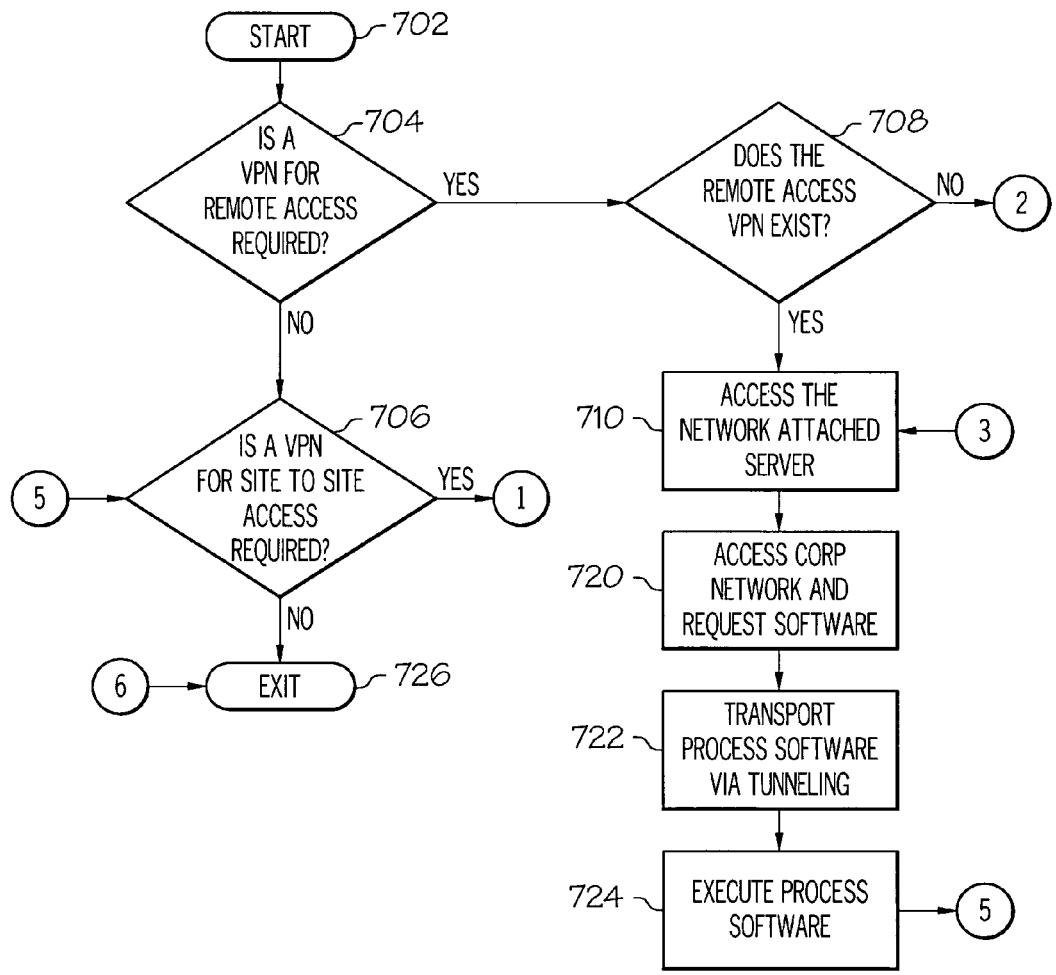
FIGS. 7A-7C show a flow-chart of steps taken to deploy in a Virtual Private Network (VPN) software that is capable of executing the steps shown and described in FIGS. 2A-3.
Figure 7B:
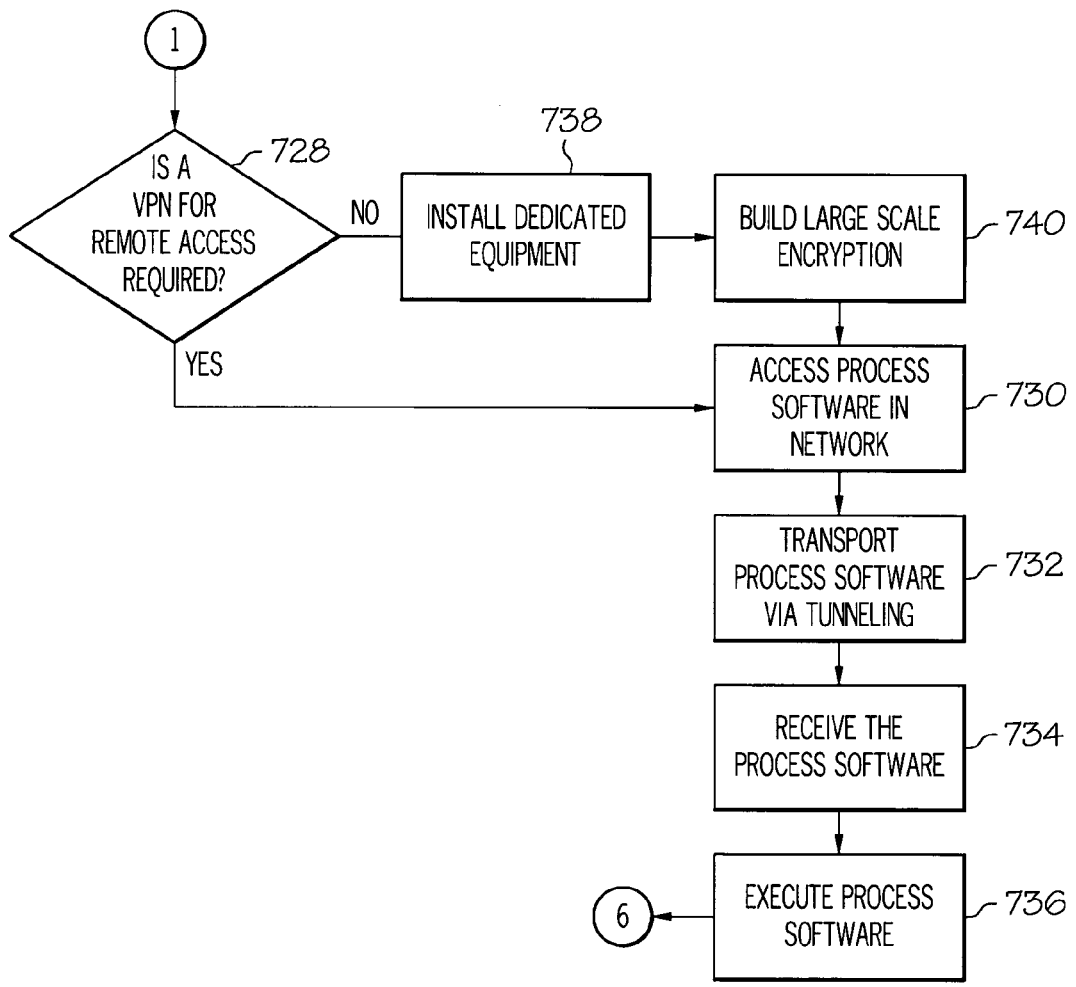
Figure 7C:
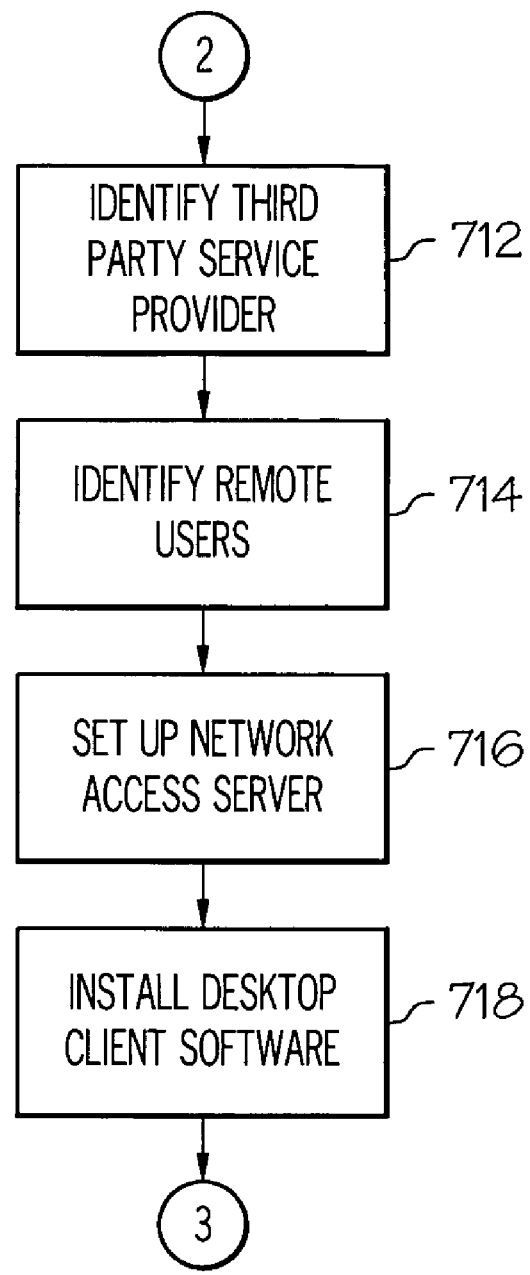

The process for such VPN deployment is described in FIGS. 7a-c. Initiator block 702 begins the Virtual Private Network (VPN) process. A determination is made to see if a VPN for remote access is required (query block 704). If it is not required, then proceed to (query block 706). If it is required, then determine if the remote access VPN exists (query block 708).

If a VPN does exist, then proceed to block 710. Otherwise identify a third party provider that will provide the secure, encrypted connections between the company's private network and the company's remote users (block 712). The company's remote users are identified (block 714). The third party provider then sets up a network access server (NAS) (block 716) that allows the remote users to dial a toll free number or attach directly via a broadband modem to access, download and install the desktop client software for the remote-access VPN (block 718).

After the remote access VPN has been built or if it been previously installed, the remote users can access the process software by dialing into the NAS or attaching directly via a cable or DSL modem into the NAS (block 710). This allows entry into the corporate network where the process software is accessed (block 720). The process software is transported to the remote user's desktop over the network via tunneling. That is the process software is divided into packets and each packet including the data and protocol is placed within another packet (block 722). When the process software arrives at the remote user's desk-top, it is removed from the packets, reconstituted and then is executed on the remote users desk-top (block 724).

A determination is then made to see if a VPN for site to site access is required (query block 706). If it is not required, then proceed to exit the process (terminator block 726). Otherwise, determine if the site to site VPN exists (query block 728). If it does exist, then proceed to block 730. Otherwise, install the dedicated equipment required to establish a site to site VPN (block 738). Then build the large scale encryption into the VPN (block 740).

After the site to site VPN has been built or if it had been previously established, the users access the process software via the VPN (block 730). The process software is transported to the site users over the network via tunneling (block 732). That is the process software is divided into packets and each packet including the data and protocol is placed within another packet (block 734). When the process software arrives at the remote user's desktop, it is removed from the packets, reconstituted and is executed on the site users desktop (block 736). The process then ends at terminator block 726.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 8A:
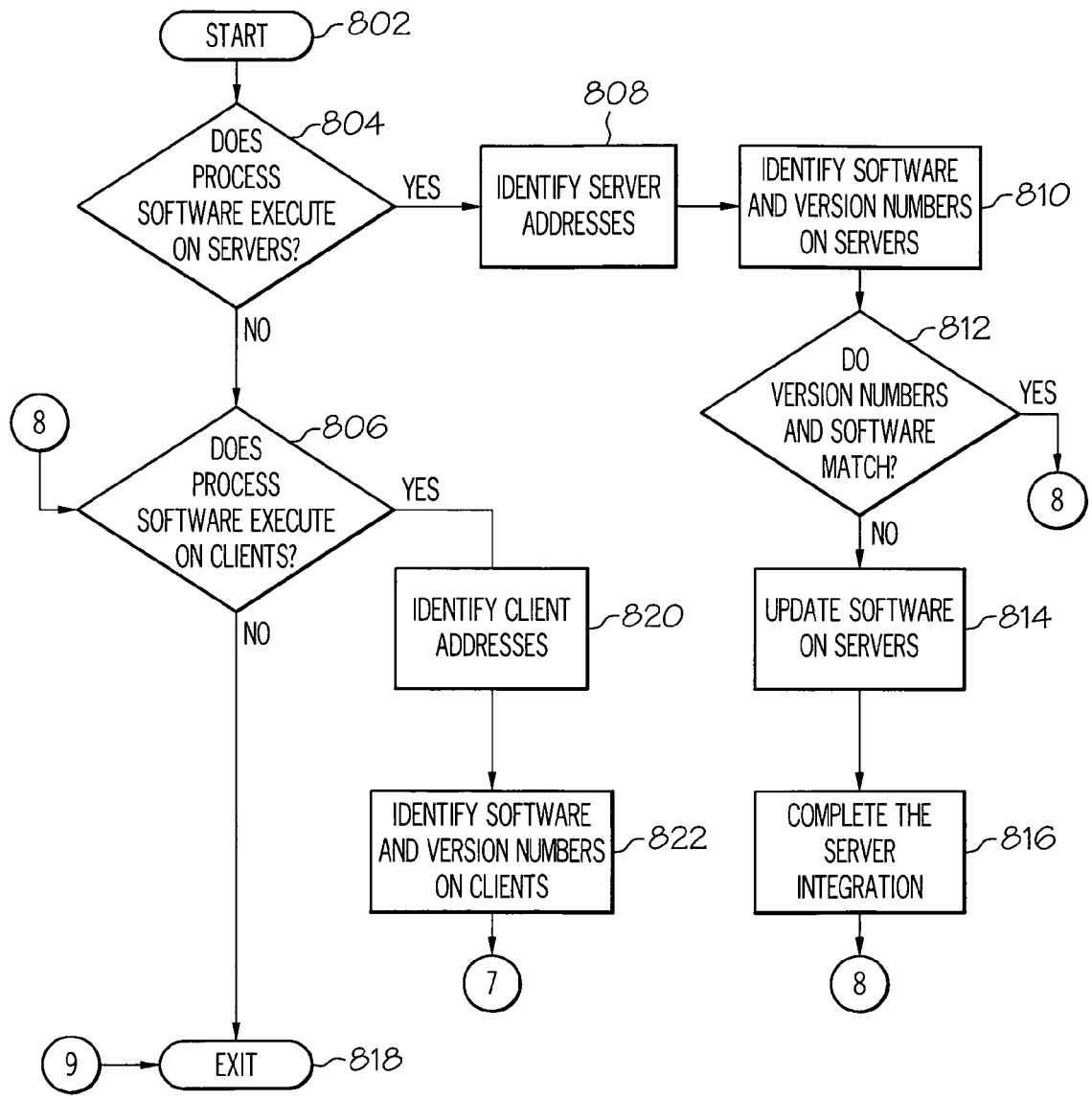
FIGS. 8A-8B show a flow-chart showing steps taken to integrate into a computer system software that is capable of executing the steps shown and described in FIGS. 2A-3.
Figure 8B:
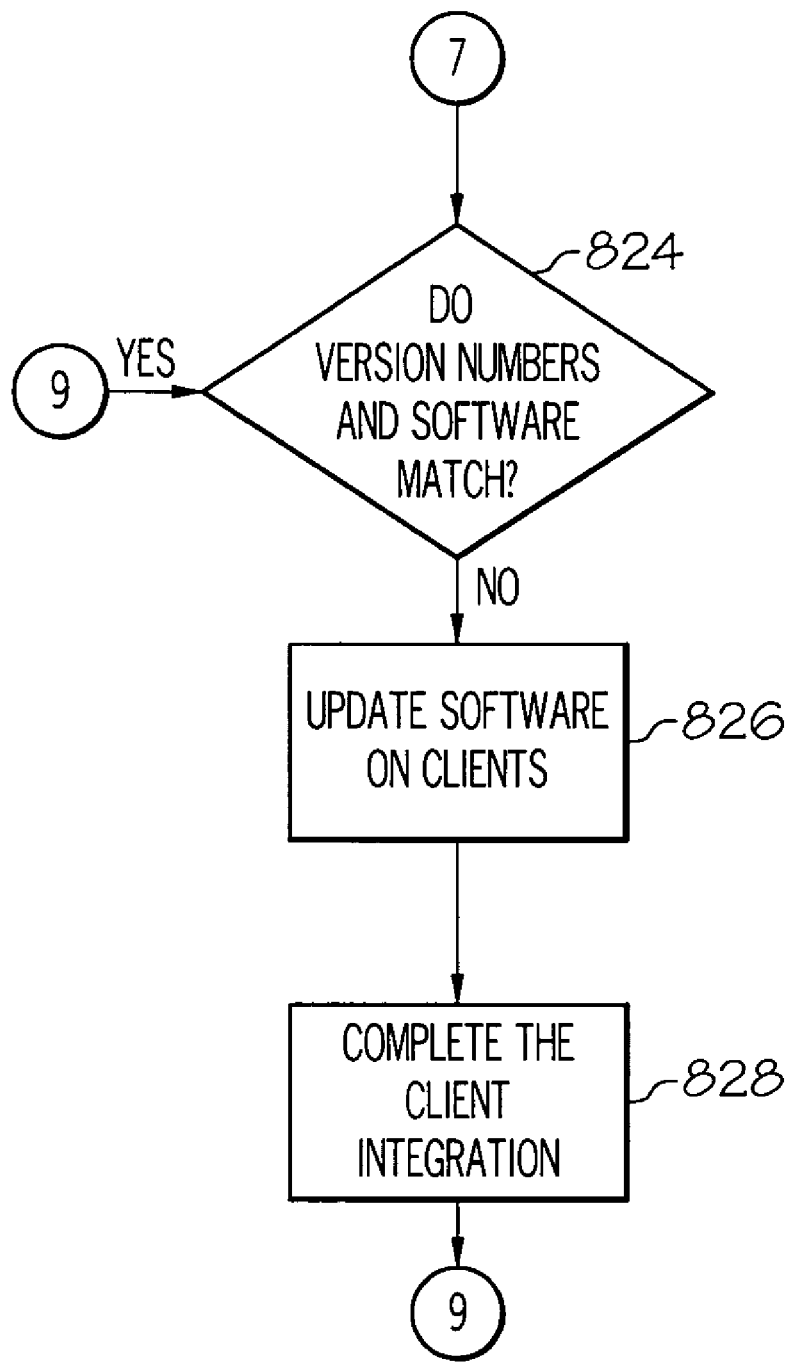

For a high-level description of this process, reference is now made to FIGS. 8*a-b*. Initiator block 802 begins the integration of the process software. The first tiling is to determine if there are any process software programs that will execute on a server or servers (block 804). If this is not the case, then integration proceeds to query block 806. If this is the case, then the server addresses are identified (block 808). The servers are checked to see if they contain software that includes the operating system (OS), applications, and network operating systems (NOS), together with their version numbers, which have been tested with the process software (block 810). The servers are also checked to determine if there is any missing software that is required by the process software in block 810.

A determination is made if the version numbers match the version numbers of OS, applications and NOS that have been tested with the process software (block 812). If all of the versions match and there is no missing required software the integration continues in query block 806.

If one or more of the version numbers do not match, then the unmatched versions are updated on the server or servers with the correct versions (block 814). Additionally, if there is missing required software, then it is updated on the server or servers in the step shown in block 814. The server integration is completed by installing the process software (block 816).

The step shown in query block 806, which follows either the steps shown in block 804, 812 or 816 determines if there are any programs of the process software that will execute on the clients. If no process software programs execute on the clients the integration proceeds to terminator block 818 and exits. If this not the case, then the client addresses are identified as shown in block 820.

The clients are checked to see if they contain software that includes the operating system (OS), applications, and network operating systems (NOS), together with their version numbers, which have been tested with the process software (block 822). The clients are also checked to determine if there is any missing software that is required by the process software in the step described by block 822.

A determination is made if the version numbers match the version numbers of OS, applications and NOS that have been tested with the process software (query block 824). If all of the versions match and there is no missing required software, then the integration proceeds to terminator block 818 and exits.

If one or more of the version numbers do not match, then the unmatched versions are updated on the clients with the correct versions (block 826). In addition, if there is missing required software then it is updated on the clients (also block 826). The client integration is completed by installing the process software on the clients (block 828). The integration proceeds to terminator block 818 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 9A:
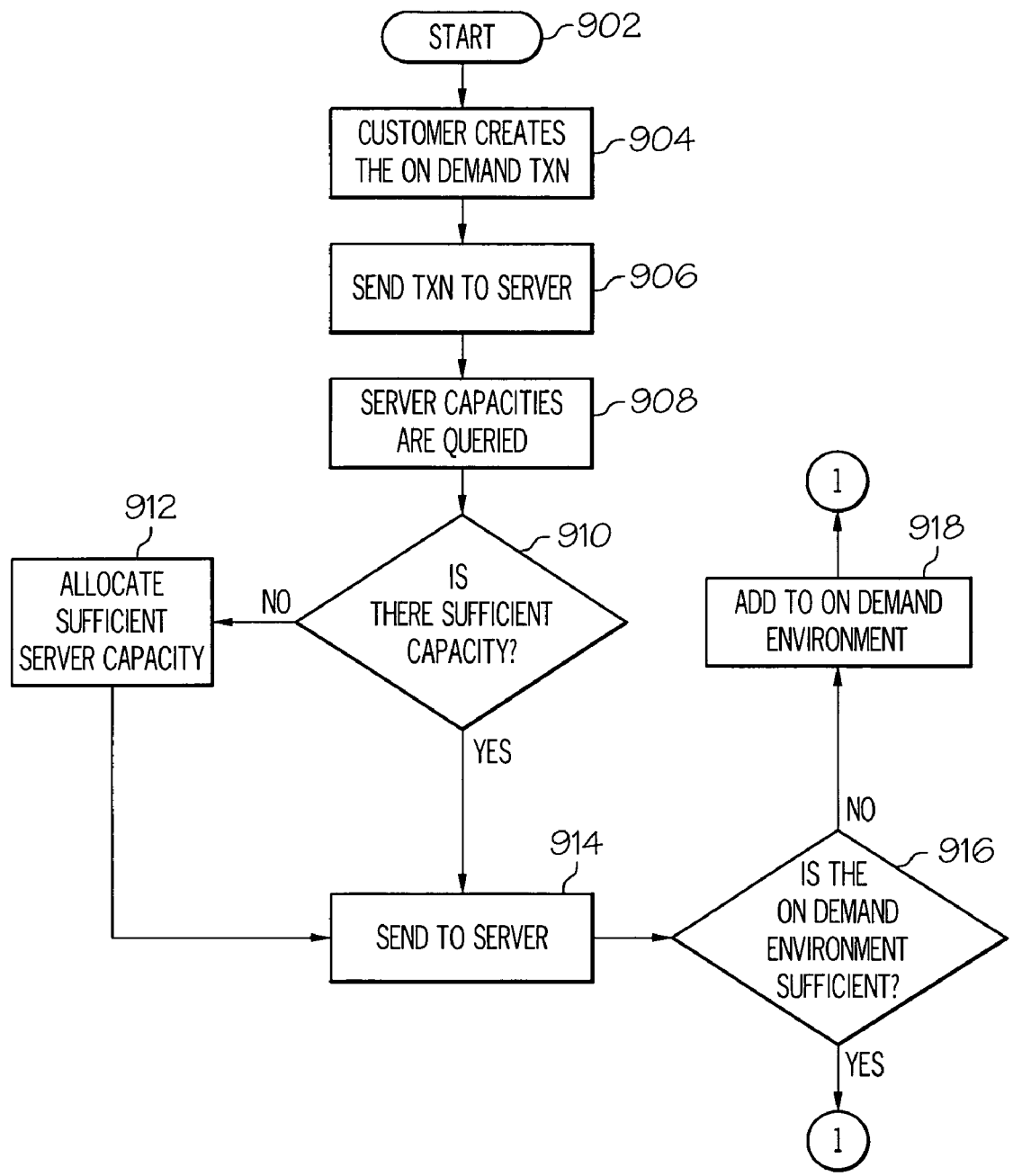
FIGS. 9A-9B show a flow-chart showing steps taken to execute the steps shown and described in FIGS. 2A-3 using an on-demand service provider.
Figure 9B:
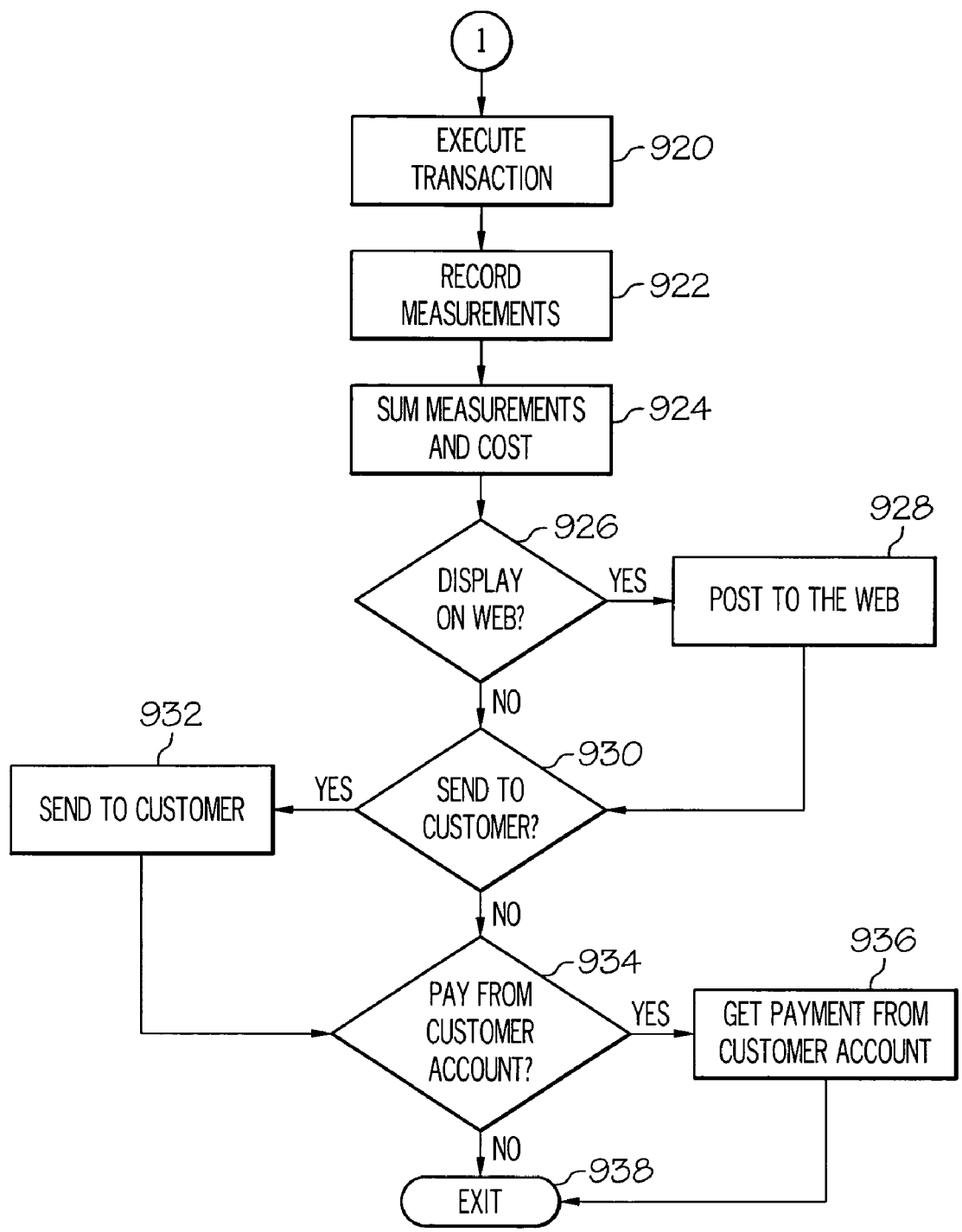

With reference now to FIGS. 9a-b, initiator block 902 begins the On Demand process. A transaction is created than contains the unique customer identification, the requested service type and any service parameters that further, specify the type of service (block 904). The transaction is then sent to the main server (block 906). In an On Demand environment the main server can initially be the only server, then as capacity is consumed other servers are added to the On Demand environment.

The server central processing unit (CPU) capacities in the On Demand environment are queried (block 908). The CPU requirement of the transaction is estimated, then the servers available CPU capacity in the On Demand environment are compared to the transaction CPU requirement to see if there is sufficient CPU available capacity in any server to process the transaction (query block 910). If there is not sufficient server CPU available capacity, then additional server CPU capacity is allocated to process the transaction (block 912). If there was already sufficient Available CPU capacity then the transaction is sent to a selected server (block 914).

Before executing the transaction, a check is made of the remaining On Demand environment to determine if the environment has sufficient available capacity for processing the transaction. This environment capacity consists of such things as but not limited to network bandwidth, processor memory, storage etc. (block 916). If there is not sufficient available capacity, then capacity will be added to the On Demand environment (block 918). Next the required software to process the transaction is accessed, loaded into memory, then the transaction is executed (block 920).

The usage measurements are recorded (block 922). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 924).

If the customer has requested that the On Demand costs be posted to a web site (query block 926), then they are posted (block 928). If the customer has requested that the On Demand costs be sent via e-mail to a customer address (query block 930), then these costs are sent to the customer (block 932). If the customer has requested that the On Demand costs be paid directly from a customer account (query block 934), then payment is received directly from the customer account (block 936). The On Demand process is then exited at terminator block 938.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer implemented method comprising:
a processor creating an assembly area in an Integrated Development Environment (IDE);
the processor associating a first component from the IDE with a second component from the IDE to create a combined component, wherein the first component is data to be stored in a data table that is the second component, and wherein the processor associates the first component with the second component by detecting the first component being dragged over the second component while a special function key is activated;
the processor, in response to detecting the user dropping the combined component in the assembly area, committing the combined component to execution;
the processor associating the combined component with a third component to create a further combined component, wherein the processor associates the combined component with the third component by detecting the user dragging the combined component over the third component while activating the special function key, and wherein the third component defines a form and appearance of the second component when displayed on a user interface; and the processor, in response to detecting a user dropping the further combined component in the assembly area, committing the further combined component to execution.

2. The computer implemented method of claim 1, wherein the first component is further associated with the second component by the first component populating the second component.

3. The computer implemented method of claim 1, wherein the first component is from a first pane in the IDE, wherein the second component is from a second pane in the IDE, and wherein the assembly area is in a third pane in the IDE.

4. The computer implemented method of claim 3, further comprising:

the processor, in response to committing the combined component to execution, automatically removing the assembly area, which contains the combined component, from the IDE.

5. The computer implemented method of claim 1, wherein the combined component is associated with a third component before being dropped in the assembly area.

6. A system comprising:
a processor;
a data bus coupled to the processor;
a memory coupled to the data bus; and
a computer readable storage device embodying computer program code, the computer program code comprising instructions executable by the processor and configured for:

creating an assembly area in an Integrated Development Environment (IDE);

associating a first component from the IDE with a second component from the IDE to create a combined component, wherein the first component is data to be stored in a data table that is the second component, and wherein the processor associates the first component with the second component by detecting the first component being dragged over the second component while a special function key is activated;

in response to detecting the user dropping the combined component in the assembly area, committing the combined component to execution;

associating the combined component with a third component to create a further combined component, wherein the processor associates the combined component with the third component by detecting a user dragging the combined component over the third component while activating the special function key, and wherein the third component describes a form of the second component; and in response to detecting a user dropping the further combined component in the assembly area, committing the further combined component to execution.

7. The system of claim 6, wherein the first component is further associated with the second component by the first component populating the second component.

8. The system of claim 6, wherein the first component is from a first pane in the IDE, wherein the second component is from a second pane in the IDE, and wherein the assembly area is in a third pane in the IDE.

9. The system of claim 8, wherein the instructions are further configured for:

in response to committing the combined component to execution, automatically removing the assembly area, which contains the combined component, from the IDE.

10. A computer readable storage device embodying computer program code, the computer program code comprising computer executable instructions configured for:

creating an assembly area in an Integrated Development Environment (IDE);

associating a first component from the IDE with a second component from the IDE to create a combined component, wherein the first component is data to be stored in a data table that is the second component, and wherein the processor associates the first component with the second component by detecting the first component being dragged over the second component while a special function key is being activated;

in response to detecting the user dropping the combined component in the assembly area, committing the combined component to execution;

associating the combined component with a third component to create a further combined component, wherein the processor associates the combined component with the third component by detecting a user dragging the combined component over the third component while activating the special function key, and wherein the third component describes a form and appearance of the second component when displayed on a user interface; and in response to detecting a user dropping the further combined component in the assembly area, committing the further combined component to execution.

11. The computer readable storage device of claim 10, wherein the first component is further associated with the second component by the first component populating the second component.

12. The computer readable storage device of claim 10, wherein the first component is from a first pane in the IDE, wherein the second component is from a second pane in the IDE, and wherein the assembly area is in a third pane in the IDE.

13. The computer readable storage device of claim 12, wherein the computer executable instructions are further configured for: in response to committing the combined component to execution, automatically removing the assembly area, which contains the combined component, from the IDE.

14. The computer readable storage device of claim 10, wherein the computer executable instructions are deployable to a client computer from a server at a remote location.

* * * * *